United States Patent
Kim et al.

(10) Patent No.: US 10,530,530 B2
(45) Date of Patent: Jan. 7, 2020

(54) METHOD AND APPARATUS FOR TRANSMITTING AND RECEIVING DATA IN MOBILE COMMUNICATION SYSTEM

(71) Applicant: Samsung Electronics Co., Ltd., Suwon-si, Gyeonggi-do (KR)

(72) Inventors: Jae-Won Kim, Seoul (KR); Hyun-Kyu Yu, Suwon-si (KR); Dong-Hwi Roh, Seoul (KR); Jeong-Ho Park, Seoul (KR); Jong-Ho Oh, Suwon-si (KR); Sung-Rok Yoon, Seoul (KR); Do-Young Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 60 days.

(21) Appl. No.: 15/168,800

(22) Filed: May 31, 2016

(65) Prior Publication Data
US 2016/0352625 A1 Dec. 1, 2016

(30) Foreign Application Priority Data
May 29, 2015 (KR) .......................... 10-2015-0076091

(51) Int. Cl.
| H04W 40/12 | (2009.01) |
| H04W 40/08 | (2009.01) |
| H04L 1/12 | (2006.01) |
| H04B 7/0408 | (2017.01) |
| H04B 7/06 | (2006.01) |
| H04B 7/08 | (2006.01) |

(52) U.S. Cl.
CPC ............ *H04L 1/12* (2013.01); *H04B 7/0408* (2013.01); *H04B 7/0695* (2013.01); *H04B 7/088* (2013.01); *H04W 40/08* (2013.01); *H04W 40/12* (2013.01); *Y02D 70/1262* (2018.01); *Y02D 70/142* (2018.01); *Y02D 70/21* (2018.01); *Y02D 70/324* (2018.01); *Y02D 70/34* (2018.01); *Y02D 70/444* (2018.01)

(58) Field of Classification Search
None
See application file for complete search history.

(56) References Cited

U.S. PATENT DOCUMENTS

| 9,614,608 B2* | 4/2017 | Jalali |
| 2006/0098580 A1 | 5/2006 | Li et al. |

(Continued)

FOREIGN PATENT DOCUMENTS

WO  2006/024993 A1  3/2006

*Primary Examiner* — Angel T Brockman
(74) *Attorney, Agent, or Firm* — Jefferson IP Law, LLP

(57) ABSTRACT

A method for transmitting data by a transmission node in a wireless communication system is provided. The method includes transmitting, to a base station, a channel information request, transmitting, to the base station, a data packet based on a first channel information value received in response to the transmitted channel information request, and awaiting reception of a response packet indicating reception of the data packet from the base station, if the reception of the response packet fails during a predetermined time interval, detecting an energy level of a signal received in the predetermined time interval, and reconfiguring one of a transmitting method for the response packet and a transmitting method for a next data packet based on the detected energy level.

20 Claims, 9 Drawing Sheets

(56) References Cited

U.S. PATENT DOCUMENTS

| | | | |
|---|---|---|---|
| 2007/0171889 A1* | 7/2007 | Kwon | H04L 5/0005 |
| | | | 370/350 |
| 2008/0049620 A1* | 2/2008 | Riga | G01D 9/005 |
| | | | 370/236 |
| 2010/0214985 A1 | 8/2010 | Chun et al. | |
| 2010/0220597 A1 | 9/2010 | Ji et al. | |
| 2012/0094681 A1 | 4/2012 | Freda et al. | |
| 2012/0134292 A1 | 5/2012 | Pandharipande et al. | |
| 2013/0258885 A1* | 10/2013 | Yu | H04W 16/28 |
| | | | 370/252 |
| 2013/0329690 A1 | 12/2013 | Kim et al. | |
| 2014/0018117 A1 | 1/2014 | Kang et al. | |
| 2015/0156762 A1* | 6/2015 | Hwang | H04L 1/1671 |
| | | | 370/311 |

\* cited by examiner

METHOD AND APPARATUS FOR TRANSMITTING AND RECEIVING DATA IN MOBILE COMMUNICATION SYSTEM

CROSS-REFERENCE TO RELATED APPLICATION(S)

This application claims the benefit under 35 U.S.C. § 119(a) of a Korean patent application filed on May 29, 2015 in the Korean Intellectual Property Office and assigned Serial number 10-2015-0076091, the entire disclosure of which is hereby incorporated by reference.

TECHNICAL FIELD

The present disclosure relates to a $5^{th}$ generation (5G) or pre-5G communication system which is to be provided to support a higher data transmission rate than that of a $4^{th}$ generation (4G) communication system such as a long term evolution (LTE).

BACKGROUND

In order to satisfy a wireless data traffic demand that is increasing after a 4th generation (4G) communication system has been commercialized, an effort is being made to develop an improved $5^{th}$ generation (5G) communication system or a pre-5G communication system. For this reason, the 5G communication system or the pre-5G communication system is called a Beyond 4G network communication system or a post long term evolution (LTE) system.

In order to achieve a high data transmission rate, the implementation of the 5G communication system in an mmWave band (for example, 60 GHz band) is being considered. In order to alleviate a path loss of a radio wave in an ultrahigh frequency band or to increase the delivery distance of the radio wave, technologies such as beamforming, a massive multi-input multi-output (massive MIMO), a full dimensional MIMO (FD-MIMO), an array antenna, analog beamforming, and a large scale antenna are discussed in the 5G communication system.

Further, technologies such as an evolved small cell, an advanced small cell, a cloud radio access network (cloud RAN), an ultra-dense network, device to device communication (D2D), a wireless backhaul, a moving network, cooperative communication, coordinated multi-points (CoMP), and interference cancellation have been developed in the 5G communication system in order to improve the system network.

In addition, the hybrid frequent shift keying (FSK) and quadrature amplitude modulation (QAM) (FQAM) and the sliding window superposition coding (SWSC) corresponding to the advanced coding modulation (ACM) and the filter bank multi-carrier (FBMC), the non-orthogonal multiple access (NOMA), and the sparse code multiple access (SCMA) corresponding to an advanced access technology, and the like are being developed in the 5G system.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for transmitting data by a transmission node in a wireless communication system.

As described above, with the development of a wireless communication system, recent user equipments (UEs) can support at least one wireless communication technology. When one wireless communication technology at the UEs is supported, interference may occur by neighboring wireless communication devices that supports the wireless communication technology using the same frequency band or adjacent frequency bands.

Otherwise, when a plurality of wireless communication technologies at the UEs are supported, interference may occur between respective wireless communication technologies using the same frequency band or adjacent frequency bands. Thus, problems may occur in that an error rate of a wireless signal by the wireless communication system is increased, and signal performance is reduced.

In accordance with an aspect of the present disclosure, a method for transmitting data by a transmission node in a wireless communication system is provided. The method includes when receiving of a response packet to receiving of a data packet fails after the data packet is transmitted, identifying a reason for the reception failure, and, when the reason is interference, reconfiguring a transmitting method for the response packet and transmitting information on the reconfigured transmitting method to the transmission node.

In accordance with another aspect of the present disclosure, a method for transmitting data by a UE in a wireless communication system is provided. The method includes transmitting, to a base station, a channel information request, transmitting, to the base station, a data packet based on a first channel information value received in response to the transmitted channel information request, and awaiting reception of a response packet indicating reception of the data packet from the base station, if the reception of the response packet fails during a predetermined time interval, detecting an energy level of a signal received in the predetermined time interval, and reconfiguring one of a transmitting method for the response packet and a transmitting method for a next data packet based on the detected energy level.

In accordance with another aspect of the present disclosure, a UE for transmitting data in a wireless communication system is provided. The UE includes a transmitter configured to transmit, to a base station, a channel information request, and transmit, to the base station, a data packet based on a first channel information value received in response to the transmitted channel information request a receiver configured to await reception of a response packet indicating reception of the data packet from the base station, and if the reception of the response packet fails during a predetermined time interval, a controller configured to detect an energy level of a signal received in the predetermined time interval, and reconfigure one of a transmitting method for the response packet and a transmitting method for a next data packet based on the detected energy level.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
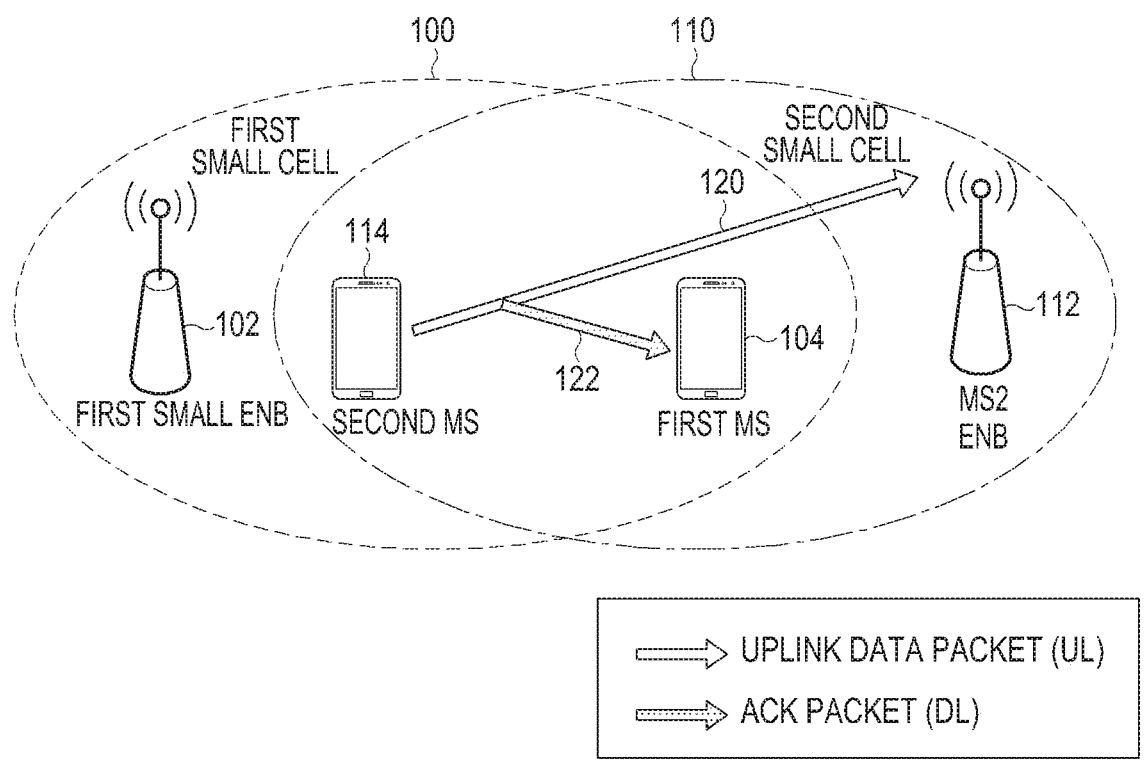
FIG. 1 is a view illustrating an example of a communication system to which an embodiment of the present disclosure is applied according to an embodiment of the present disclosure.

FIG. 1 is a view illustrating an example of a communication system to which an embodiment of the present disclosure may be applied according to an embodiment of the present disclosure.

Referring to FIG. 1, it is assumed that the communication system includes, for example, two adjacent small cells. Further, it is assumed that a mobile station (MS) 1 104 is located within a service coverage of a first small evolved node B (eNB) 102 and a second MS 114 is located within a service coverage of a second small eNB 112. For the convenience of description, it is assumed that both the first small eNB 102 and the second small eNB 112 use the same frequency band, for example, 60 GHz.

Figure 2:
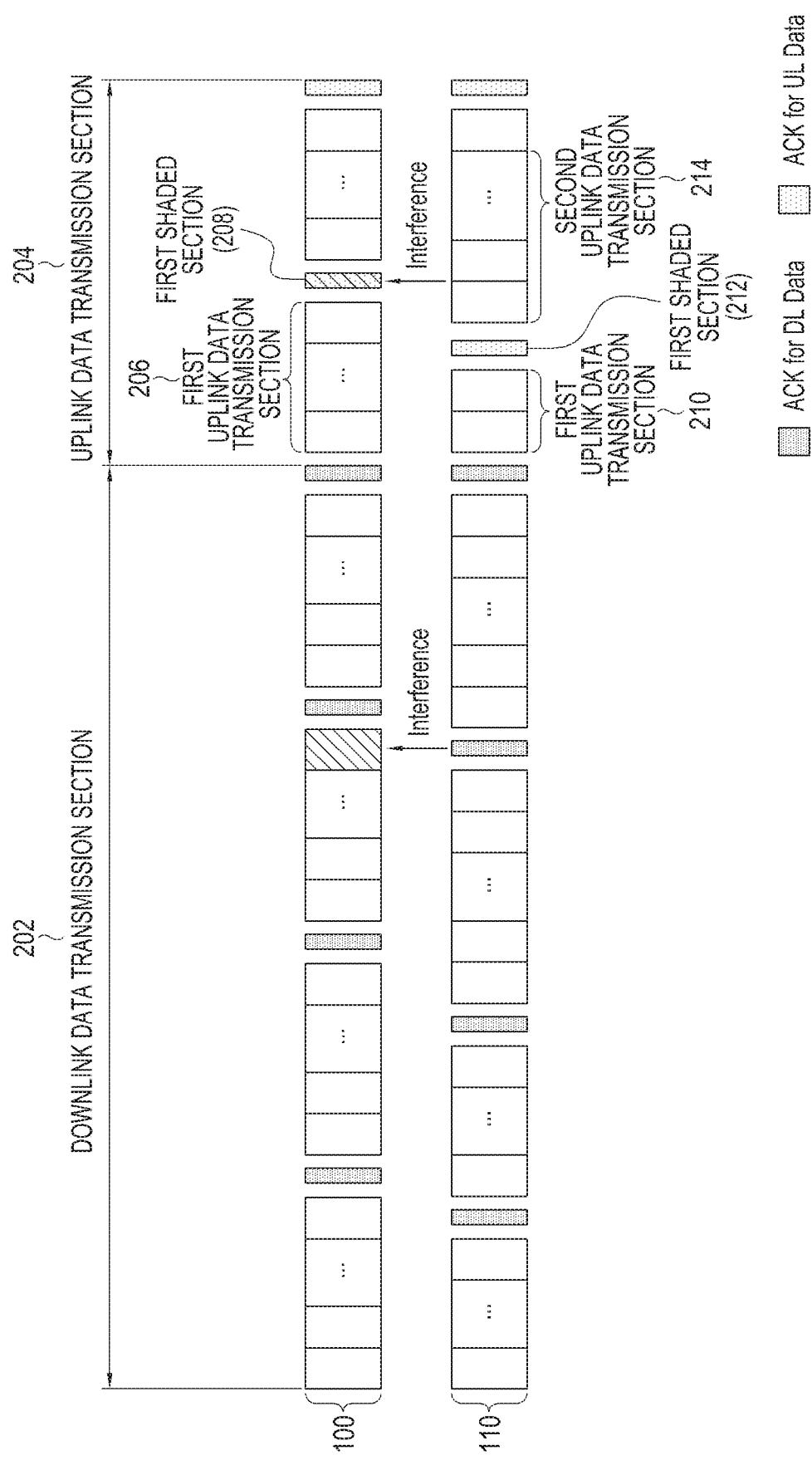
FIG. 2 is a view illustrating an example of a data transmission section applied to the communication system of FIG. 1 according to an embodiment of the present disclosure.

FIG. 2 is a view illustrating an example of a data transmission section applied to the communication system of FIG. 1 according to an embodiment of the present disclosure.

Referring to FIG. 2, data transmission sections of each of the first small cell 100 and the second small cell 110 of FIG. 1 are classified into a downlink data transmission section 202 and an uplink data transmission section 204. Further, it is assumed that the data transmission sections of the first small cell 100 and the second small cell 110 adjacent to each other are synchronized with each other. Here, the data transmission sections include a section in which acknowledgement (ACK) packet transmission to a reverse link within a data transmission section is possible. As a concrete example, at a first uplink data transmission section 206 of the first small cell 100, the first MS 104 transmits uplink data to the first small eNB 102. Here, in a first shaded section 212 overlapping with the first uplink data transmission section 206 of the MS 1 104, the second MS 114 may receive, from the second small eNB 112, an ACK packet for uplink data transmitted at a first uplink data transmission section 210 of the second MS 114.

As described above, a communication system, which uses the data transmission section including a section in which ACK packet transmission in a reverse link within a unidirectional data transmission section is possible, has advantages of actively coping with a rapid change of a channel as well as minimizing the delay of data transmission.

However, an interference effect may occur in the above data transmission section because signals of a reverse link are simultaneously transmitted between adjacent cells. For example, referring to FIG. 1, after the first shaded section 212, when the second MS 114 transmits an uplink data packet to the second small eNB 112 at a second uplink data transmission section 214, the first MS 104 may receive, from the first small eNB 102, an ACK packet for uplink data that is transmitted at the first uplink data transmission section 206, at a first shaded section 208 of an uplink data transmission section of the first MS 104, which overlaps with the second uplink data transmission section 214. In this case, the first MS 104 may fail to receive an ACK packet for uplink data of the first small eNB 102 as in reference numeral 122 of FIG. 1 due to the transmission of the uplink data packet of the second MS 114 as in reference numeral 120 of FIG. 1.

Therefore, the present discloses proposes a method for identifying whether an interference situation occurs if a reception node fails to receive control information when a data transmission section including a section in which transmitting control information in a reverse link within a unidirectional data transmission section is possible is applied to a communication system including adjacent small cells, and when the interference situation is detected, allowing the reception node to determine a transmitting method for the control information and notify a transmission node of the determined transmitting method. The transmission node for transmitting a data packet according to an uplink and a downlink and the reception node for receiving the same may correspond to a UE and an eNB, respectively, or in contrast, may correspond to the eNB and the UE, respectively. In configurations of FIGS. 3, 4, 5, 6A to 6C, and 7, which will be described below, the description therefor will be made while an uplink situation is configured as an example. However, these various embodiments may be applied even to a downlink situation.

Figure 3:
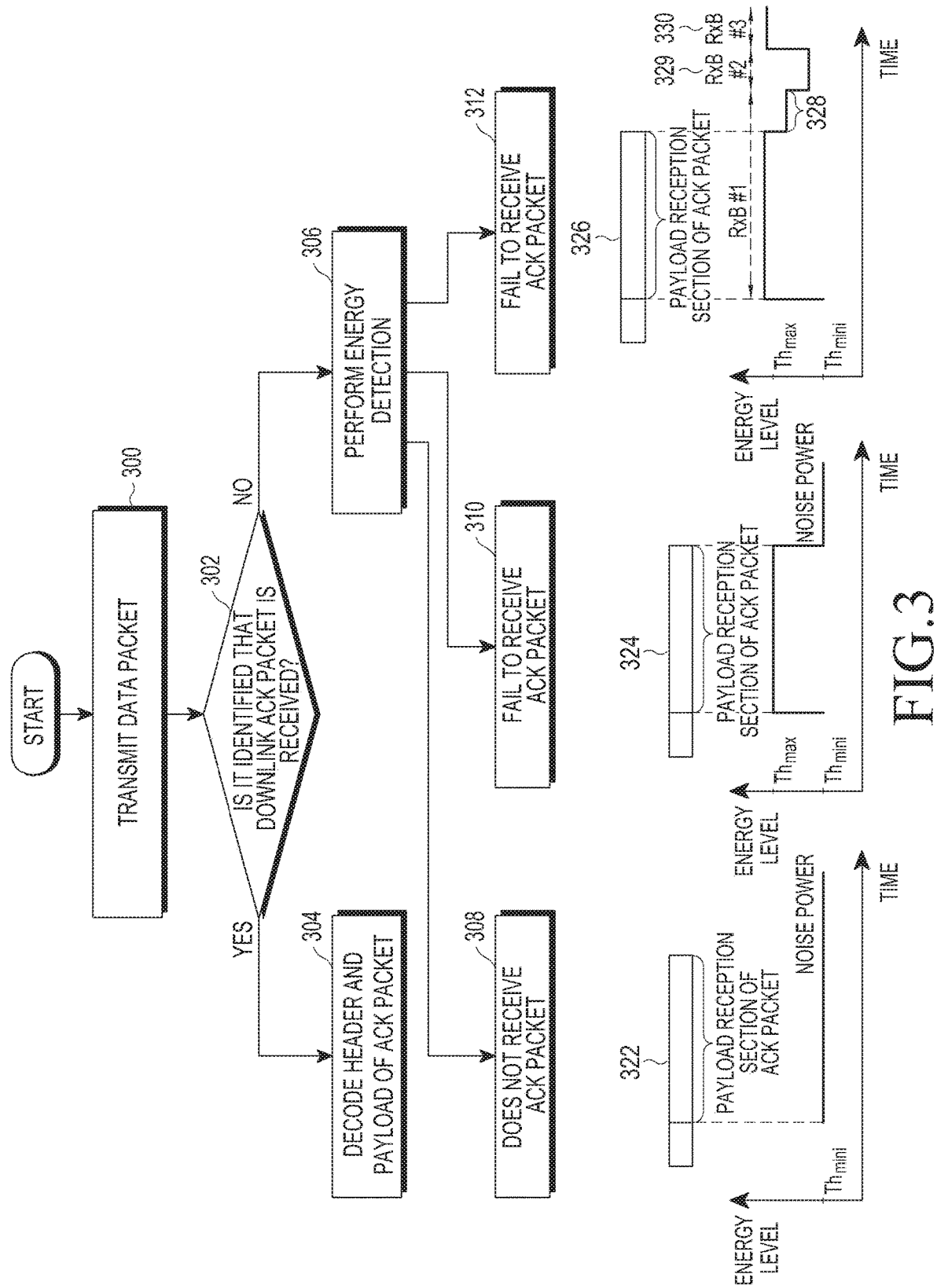
FIG. 3 is an example of a flowchart illustrating a method for identifying a reason for interference when a user equipment (UE) detects a failure to receive a data packet transmitted by the UE according to an embodiment of the present disclosure.

FIG. 3 is an example of a flowchart of identifying a reason for interference when a UE detects a failure to receive a data packet transmitted by the UE according to an embodiment of the present disclosure. For the convenience of description, it is assumed that the communication system structure of FIG. 1 and the data transmission section of FIG. 2 are applied to an operation of FIG. 3.

Referring to FIG. 3, in operation 300, a UE transmits a data packet at a predetermined data transmission section. Here, the UE transmits, to the eNB, downlink ACK packet related information, for example, modulation and coding scheme (MCS) level information, together with a data packet. In operation 302, the UE waits for receiving an ACK packet corresponding to the transmitted data packet in a predetermined time section. Here, the predetermined time section corresponds to the shaded sections 208 and 212 of FIG. 2 as a detailed example. When the ACK packet is transmitted from the eNB at the predetermined time section, the UE detects a preamble signal of the ACK packet, and decodes a header and a payload signal, in operation 304. Further, the UE identifies, through a result of the decoding, whether the eNB normally receives the data packet, and proceeds to retransmit some signals within the data packet or transmits a new data packet according to a result of the identifying.

When, in operation 302, the ACK packet is not received during the predetermined section the method proceeds to operation 306. Here, the case where the ACK packet was not received, that is the ACK packet is not received may include a case where a preamble signal of the ACK packet is not detected or a case where the decoding of the header of the ACK packet fails. In this case, the UE performs energy detection for a reception signal detected at the predetermined time section, in operation 306. Further, the UE may classify a reason for the failure to receive the ACK packet totally into three situations (308, 310, and 312) on the basis of a result of performing the energy detection.

First, as a result of performing the energy detection, as illustrated in reference numeral 322, when an energy level of the reception signal, which is detected at a section in which a payload of the ACK packet previously recognized by the UE is received, is maintained at the minimum threshold Th_min previously recognized by the UE, the UE determines the reason as a first situation in which the eNB does not transmits the ACK packet.

Next, as the result of performing the energy detection, as illustrated in reference numeral 324, when the energy level of the reception signal, which is detected at a time section in which the payload of the ACK packet is received, corresponds to the previously-recognized maximum threshold Th_max, and the energy level drops to the minimum threshold Th_min at a time point when the time section in which the payload is received is terminated, the UE determines the reason as a second situation in which the eNB transmits the ACK packet, but the UE fails to receive the ACK packet due to temporary deterioration of reception performance.

Finally, as the result of performing the energy detection, as illustrated in reference numeral 326, the energy level of the reception signal, which is detected at the time section in which the payload of the ACK packet is received, is larger than the maximum threshold Th_max, and unlike reference numeral 324, the energy level is maintained larger than the minimum threshold Th_min at a time section 328 subsequent to the time section in which the payload is received. In this case, the UE determines the reason as a third situation in which the UE fails to receive the ACK packet due to an interference situation. Thereafter, when the reason for the failure to receive the ACK packet is recognized as one situation among the three situations on the basis of the result of performing the energy detection, the UE according to the embodiment of the present disclosure reconfigures the transmitting method for the data packet or the ACK packet according to the corresponding situations. A detailed operation procedure for reconfiguring the transmitting method for the data packet or the ACK packet according to each situation will be described through embodiments of FIGS. 4, 5, and 6A to 6C.

Figure 4:
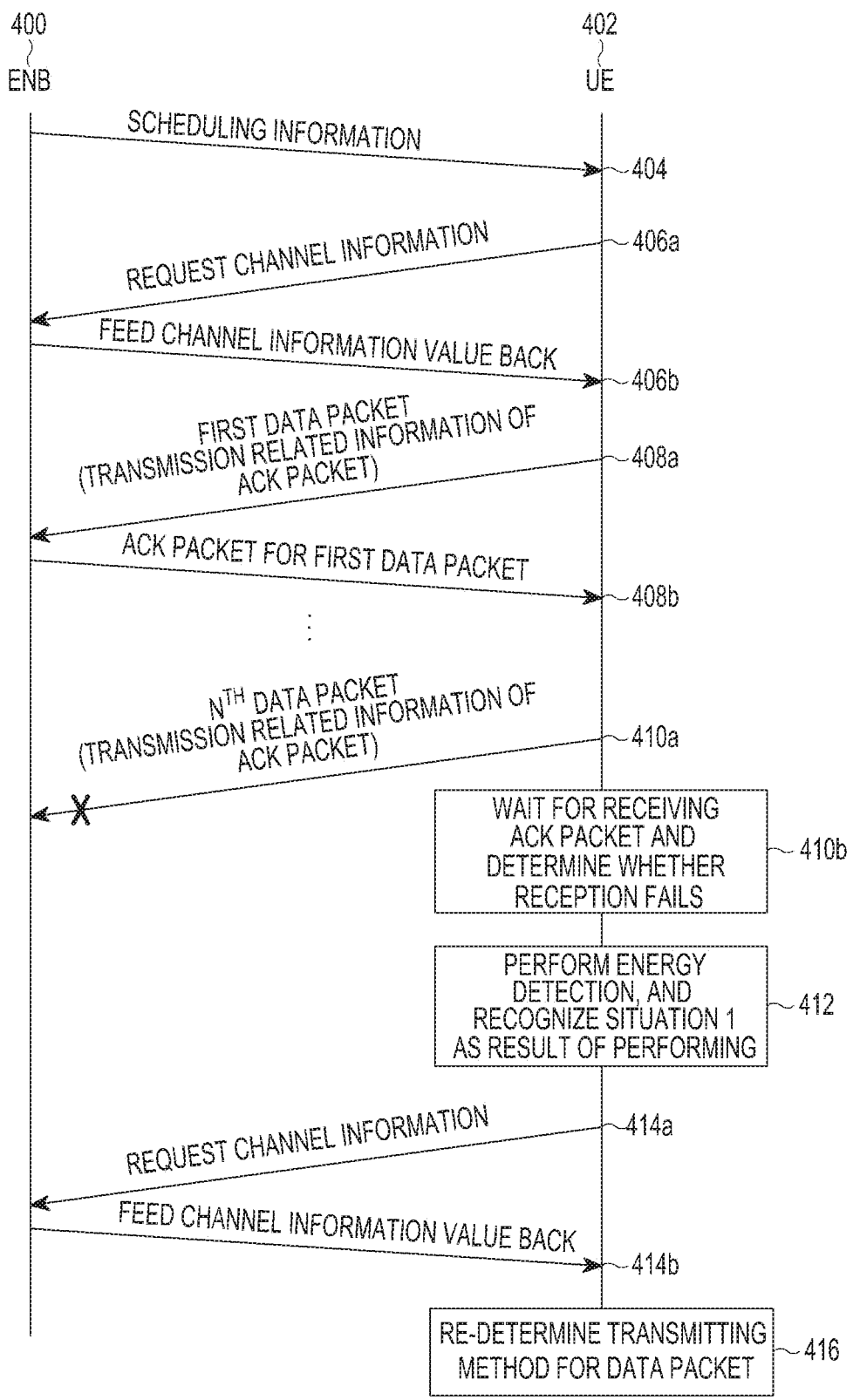
FIG. 4 is an example of a flowchart illustrating a method for recognizing failure to receive a data packet transmitted by the UE as a first situation and reconfiguring a transmitting method for the data packet by the UE according to an embodiment of the present disclosure.

FIG. 4 is an example of a flowchart of recognizing the failure to receive a data packet transmitted by the UE as a first situation and reconfiguring a transmitting method for a data packet by the UE according to an embodiment of the present disclosure.

Referring to FIG. 4, in operation 404, an eNB 400 determines scheduling information for data packet transmission by a UE 402, and transmits the determined scheduling information to the UE 402. Here, the scheduling information is time and frequency information allocated for data transmission of the UE 402, which may include, for example, information on the start time and the length of a time and frequency resource, and the like. Such scheduling information can be transmitted to the corresponding UE at a transmission section of the scheduling information, which corresponds to a predefined separate resource section.

The UE 402 having received the scheduling information transmits a channel information request to the eNB 400, in operation 406a. Further, the channel information request may include transmitting a plurality of reference signals used for measuring channel information of the eNB 400. The reference signals may be transmitted through different beamforming settings (for example, direction and beam pattern). Candidates of the beamforming settings may be previously determined through a beam selecting procedure between the UE/the eNB at a predetermined section. Since the beam selecting procedure between the UE/the eNB does not correspond to the technical range proposed by the present disclosure, the detailed description therefor will be omitted herein.

In operation 406b, the eNB 400 measures a channel, and feeds a channel information value measured according to the request back to the UE 402. The channel information value may be measured in a process of receiving the packet transmitted from the UE 402 in operation 406a, and is measured according to each of the plurality of transmitted reference signals. The channel information value may include at least one of the intensity of a reception signal, a signal to interference plus noise ratio (SINR), and information on whether the packet transmitted in operation 406a is successfully received. The channel information value may be fed back according to one or more reference signals, and the channel information value may include, together, information on which reference signal the fed-back channel information value corresponds to.

In operation 408a, the UE 402 determines the transmitting method for the data packet using the received channel information value, and transmits, to the eNB 400, a first data packet, which is the first data packet, using the determined transmitting method for the data packet. The transmitting method may configure beamforming to be used when the first data packet is transmitted, and may include a process of determining the MCS value. For example, the MCS value corresponding to the fed-back channel information value can be determined on the basis of an MCS table in which MCS values are stored in advance the beamforming to be used when the first data packet may be used in which a channel information value corresponding to the highest MCS is selected from one or more fed-back channel information values, and a beamforming setting used for transmission of a reference signal corresponding to the selected channel information value is transmitted. For example, the MCS table may include a plurality of channel information ranges in which the corresponding channel information value may be included, and a mapping table for an MCS level corresponding to each range. For example, the first data packet to be transmitted may include one preamble, one header, and L payload signals. As a concrete example, the first data packet may use an aggregated MAC protocol data unit (A-MPDU) structure, which has been used in the conventional Wi-Fi.

Further, in operation 408a, the first data packet may be transmitted together with transmission related information of the downlink ACK packet. For example, the transmission related information of the downlink ACK packet may include an MCS value applied to an ACK packet, beamforming setting information (for example, beam index information) used to transmit the ACK packet, information on timing at which the ACK packet is to be transmitted, and the like.

It is assumed that the eNB 400 succeeds in receiving the first data packet. Then, the eNB 400 generates an ACK signal of the first data packet using the transmission related information of the downlink ACK packet, which the eNB 400 receives together with the first data packet, and transmits the ACK packet to the UE 402, in operation 408b. For example, when the transmission related information of the ACK packet indicates an MCS 1 level, the eNB 400 generates an ACK packet to which the MCS 1 level is applied. Further, the ACK packet is transmitted after an inter-frame spacing (IFS) time section predetermined at a time point when a transmission section of the first packet is terminated. For example, 3us may be used as the IFS. When the first data packet includes L payloads, the ACK packet may include information on whether each of the L payload signals are successfully received.

Further, while operation 408a to operation 408b are repeatedly performed, the UE 402 sequentially transmits data packets to be transmitted to the eNB 400. Thereafter, in operation 410a, it is assumed that the UE 402 transmits an $N^{th}$ data packet to the eNB 400, but the eNB 400 fails to normally receive the $N^{th}$ data packet.

In the present disclosure, the normal reception indicates a case where the eNB detects a preamble of the corresponding data packet, and succeeds in decoding a header. Accordingly, in the present disclosure, the failure in the normal reception indicates a case where the eNB does not detect a preamble of the corresponding data packet or fails to decode a header. Then, the eNB 400 fails to receive the $N^{th}$ data packet, and thus, does not transmit, to the UE 402, an ACK packet indicating whether payload signals within the $N^{th}$ data packet are successfully received. The UE 402 waits for receiving the ACK packet corresponding to the $N^{th}$ data packet within a predetermined time section and then recognizes the failure to receive the ACK packet, in operation 410b, and performs energy detection, in operation 412. As a result of preforming the energy detection, it is determined that the eNB 400 does not transmit the ACK packet. Thus, the UE 402 identifies that an energy level of the reception signal, which is detected in a time section corresponding to the transmission of the ACK packet, is maintained at the minimum threshold Th_min, as in operation 322 of FIG. 3. In this case, the UE 402 recognizes a current situation as the first situation in which the eNB 400 has not transmitted the ACK packet of the $N^{th}$ data packet. In this case, the UE 402 according to a first embodiment of the present disclosure transmits a channel information request to the eNB 400 again in operation 414a, and receives a channel information value from the eNB 400 in operation 414b. Then, in operation 416, the UE 402 re-determines the transmitting method for the data packet on the basis of the channel information value. The transmission method for the data packet, which is re-determined in the present disclosure, may be classified into three types. First, when the channel information value indicates a case where reception deterioration occurs temporarily, but does not result from a transmission channel environment of the data packet, the UE 402 can perform retransmission using the transmitting method for the $N^{th}$ data packet as it is.

Second, when the channel information value received in operation 414b is worse than the channel information value received in operation 406b, the UE 402 reconfigures the beamforming and the MCS value for transmission of the $N^{th}$ data packet, and retransmits the $N^{th}$ data packet on the basis of the reconfigured transmitting method. In detail, the UE 402 may change an MCS level mapped to the channel information value received in operation 414b to an MCS level for the retransmission on the basis of the stored MCS table, and may change a beam index having the highest MCS level among beam indexes corresponding to the reference signals, respectively, to a beam index for the retransmission.

Finally, when the channel information value received in operation 414b indicates a channel environment in which the transmission of the data packet is impossible, the UE 402 terminates the transmission of the data packet, and transmits a request to perform a beam searching procedure to the eNB 400. The beam searching procedure may be performed in a data transmission section preassigned to the UE 402, or may be performed in a resource section separately assigned for beam searching. The case where the channel information value indicates the channel environment in which the transmission of the data packet is impossible may include, for example, a case where there is no MCS level mapped to the previously-stored MCS table.

Figure 5:
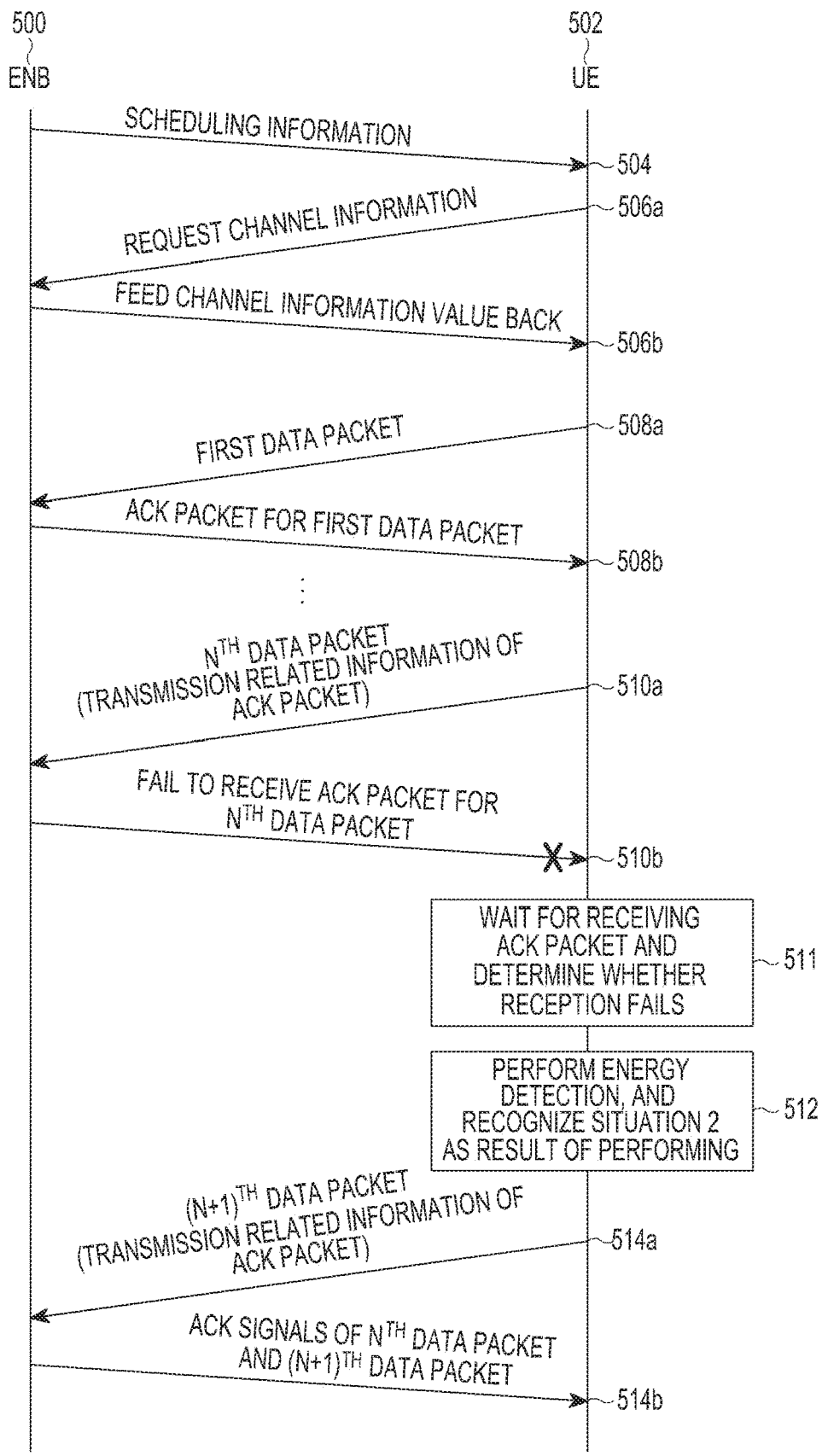
FIG. 5 is an example of a flowchart illustrating a method for recognizing the failure to receive the control information as a second situation and transmitting a data packet by the UE according to an embodiment of the present disclosure.

FIG. 5 is an example of a flowchart of recognizing the failure to receive the control information as a second situation and reconfiguring a transmitting method for a data packet by the UE according to an embodiment of the present disclosure.

Referring to FIG. 5, like operation 404, in operation 504, an eNB 500 determines a resource region section for data packet transmission of a UE 502, and transmits information on the resource region section to the UE 502 while the resource region section is included in scheduling information. Here, since the scheduling information is configured to be the same as the scheduling information in operation 404 of FIG. 4, the duplicated description therefor will be omitted. Further, similar to operations 406a to 406b of FIG. 4, in operations 506a to 506b the UE 502 transmits a channel information request to the eNB 500, and receives feedback for the channel information value from the eNB 500 in response thereto.

The UE 502 transmits a first data packet to the eNB 500 using a resource acquired from the scheduling information in operation 508a, and receives an ACK packet for the first data packet from the UE 500 in operation 508b. Since operations 508a to 508b are duplicated with operations 408a to 408b of FIG. 4, the detailed description therefor will be omitted.

Further, while operations 508a to 508b are repeatedly performed, the UE 502 sequentially transmits data packets to be transmitted to the eNB 500. Thereafter, in operation 510a, the UE 502 transmits an $N^{th}$ data packet to the eNB 500. However, in operation 510b, it is assumed that the UE 502 fails to receive an ACK packet corresponding to the $N^{th}$ data packet. Here, the failure to receive the ACK packet implies a case where the UE 502 fails to detect a preamble of the ACK packet or fails to decode a header. Then, in operation 511, the UE performs energy detection. As a result of performing the energy detection, as illustrated in reference numeral 324 of FIG. 3, it is assumed that an energy level of a reception signal, which is detected in a time section corresponding to the transmission of the ACK packet, is maintained at the maximum threshold Th_max, and drops to the minimum threshold Th_min at a time point when the time section is terminated. Through the above-described result of detecting the energy level, in operation 512, the UE 502 may recognize a current situation as the second situation in which the reception of the ACK packet fails due to the occurrence of a temporary reception error at a time point corresponding to the preamble and header transmission. In this case, the UE 502 according to an embodiment of the present disclosure assumes that the eNB 500 successfully receives the $N^{th}$ data packet. Further, in operation 514a, the UE 502 transmits, to the eNB 500, transmission related information of a downlink ACK packet together with a $(N+1)^{th}$ data packet which is a next data packet. Further, in operation 514b, the UE 502 receives, from the eNB 500, an ACK packet including all information indicating whether the $(N+1)^{th}$ data packet is successfully received as well as the $N^{th}$ data packet. Accordingly, the UE according to an embodiment of the present disclosure performs the energy detection so as to acquire the second situation, thereby preventing an unnecessary retransmission of the $N^{th}$ data packet, the ACK signal corresponding thereto being not received.

Figure 6A:
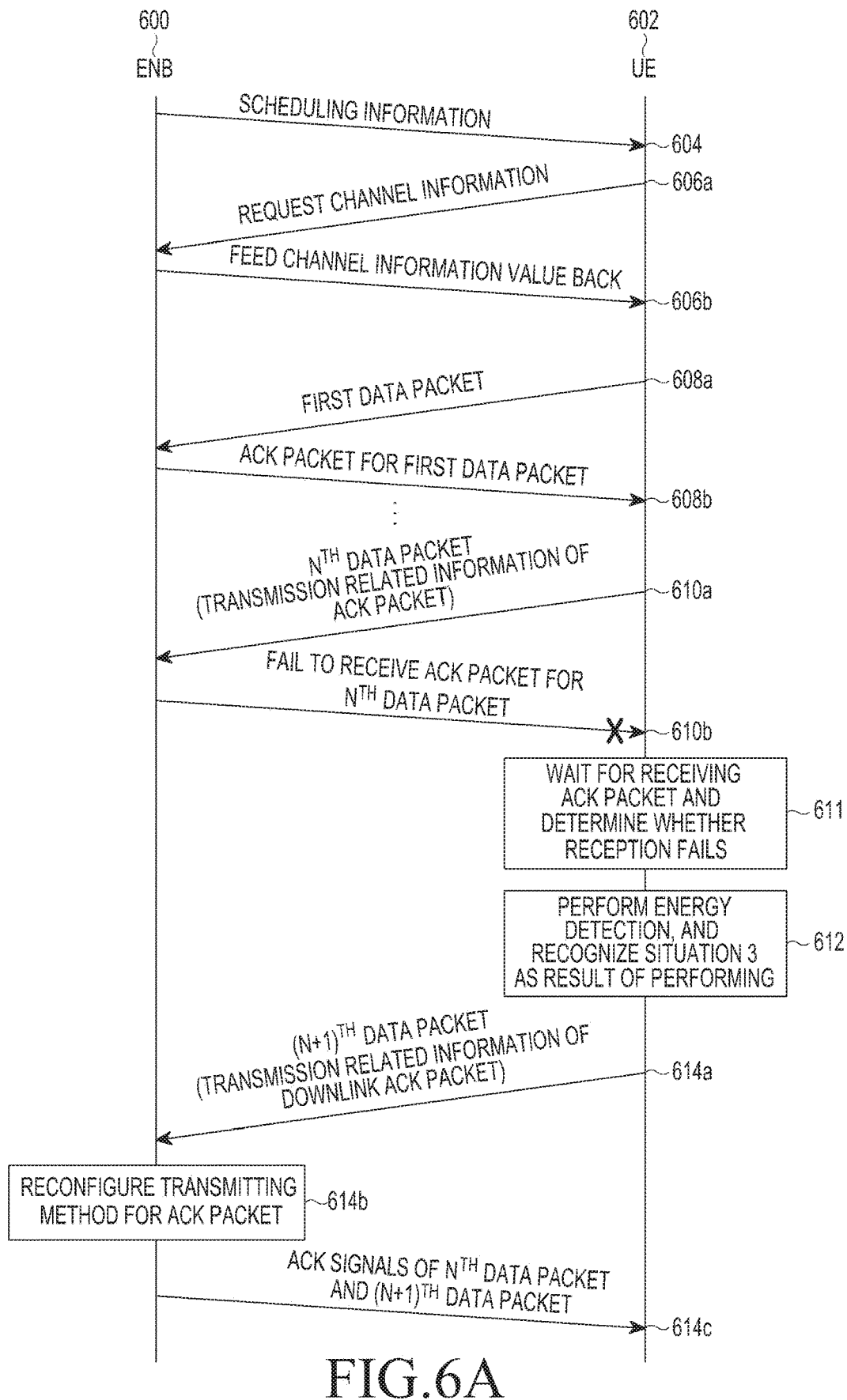
FIG. 6A is an example of a flowchart illustrating a method for recognizing the failure to receive the control information as a third situation and reconfiguring a transmitting method for a data packet by the UE according to an embodiment of the present disclosure.

FIG. 6A is an example of a flowchart of recognizing the failure to receive the control information as a third situation and reconfiguring a transmitting/receiving method for a data packet and an ACK packet by the UE according to an embodiment of the present disclosure.

Referring to FIG. 6A, operations 604 to 610a are performed identically to operations 504 to 510a of FIG. 5. Likewise, in operation 610b, it is assumed that the UE 602 fails to receive the ACK packet for the $N^{th}$ data packet. Failure is determined after waiting in operation 611. Then, in operation 612, the UE 602 performs energy detection. As the result of performing the energy detection, as illustrated in reference numeral 326 of FIG. 3, the energy level of the reception signal, which is detected during a time section corresponding to the transmission of the ACK packet for the $N^{th}$ data packet, is maintained at the maximum threshold Th_max or higher. As illustrated in reference numeral 328, when the energy level is maintained at a larger value than the minimum threshold Th_min during a predetermined time section from a time point when the time section is terminated, in operation 512 the UE 602 may recognize a current situation as the third situation in which the reception of the ACK packet fails by interference. Then, the UE 602 according to the corresponding embodiment reconfigures transmission related information of a downlink ACK packet in order to overcome the interference. In detail, the UE 602 according to the present disclosure may reconfigure the solution to one of a first scheme of changing a beamforming setting used for the transmission and the reception of the ACK packet, a second scheme of making a request to downwardly configure the MCS level of the ACK packet, and a third scheme (Delayed ACK) of transmitting the ACK packet in a separate resource section region after the transmission of the data packets within the resource region scheduled by the UE 602 is completed. Further, the UE 602 generates the transmission related information of the downlink ACK packet corresponding to the reconfigured schemes, and transmits, to the eNB 600, the reconfigured transmission related information of the ACK packet together with the $(N+1)^{th}$ data packet, which is a next data packet, in operation 614a. In case of the first scheme, the UE 602 may determine, through the previously-performed separate beam selecting procedure, one or more candidate beams which can be used as a reception beam of the ACK packet. Further, as illustrated in reference numeral 329 and reference numeral 330 of FIG. 3, the UE 602 measures an energy level of a reception signal for the determined candidate beams, and calculates, on the basis of the measured value, an SINR value for a case where each of the candidate beams is configured as a reception beam of the ACK packet. Further, the UE 602 may select one of candidate beams having a larger SINR value than an SINR value used for successful decoding of the ACK packet among the SINR values calculated for the candidate beams. As an embodiment of the selection process, the UE 602 may select a candidate beam having the maximum SINR value as a reception beam of the ACK packet. According to another embodiment, the UE 602 may select a candidate beam having the minimum energy level of a reception signal among the candidate beams as the reception beam of the ACK packet. Meanwhile, when the maximum value of the SINR values calculated for the candidate beams is smaller than an SINR value used for successful decoding of the ACK packet, the UE 602 may determine that the first scheme cannot be used, and alternatively uses one of the second scheme and the third scheme.

Meanwhile, it is assumed that an optimum transmission bean of the eNB 600, which corresponds to the candidate beam selected as the reception beam of the ACK packet for the UE 602, is different from the conventional transmission beam, which has been used for transmitting the ACK packet by the eNB 600. Then, in operation 614a, the UE 602 may transmit, to the eNB 600, together with the $(N+1)^{th}$ data packet, information making a request to change the transmission beam of the eNB 600 to a new transmission beam corresponding to the selected reception candidate beam. As a detailed example, it is assumed that candidate beams determined through a separate procedure between the UE 602 and the eNB 600 include a reception beam 2 and a reception beam 3. In this case, the UE 602 calculates an SINR value by performing energy detection for the reception beam 2 and the reception beam 3, as illustrated in reference numeral 329 and reference numeral 330 of FIG. 3. As an example, it is assumed that the reception beam 2 having the maximum SINR value is selected as a new reception beam of the UE 602. Then, the UE 602 may transmit, to the eNB 600, optimal transmission beam information of the eNB 600, which corresponds to the reception beam 2. Here, when the optimal transmission beam information is different from the conventional transmission beam, which has been used for transmitting the ACK packet, in operation 614b the eNB 600 may configure an optimal transmission beam corresponding to the reception beam 2 as a transmission usage of the ACK packet. Accordingly, in operation 612b, the UE 602 transmits, to the eNB 600, together with the (N+1)$^{th}$ data, information making a request to change a transmission beam to be used for transmitting the ACK signal to an optimal transmission beam corresponding to the reception beam 2. Then, in operation 614b the eNB 600 change the transmission beam to be used for transmitting the ACK signal as the optimal transmission beam.

Thereafter, in operation 614c, the eNB 600 transmits the ACK packet of the (N+1)$^{th}$ data packet to the UE 602 through the changed transmission beam.

Figure 6B:
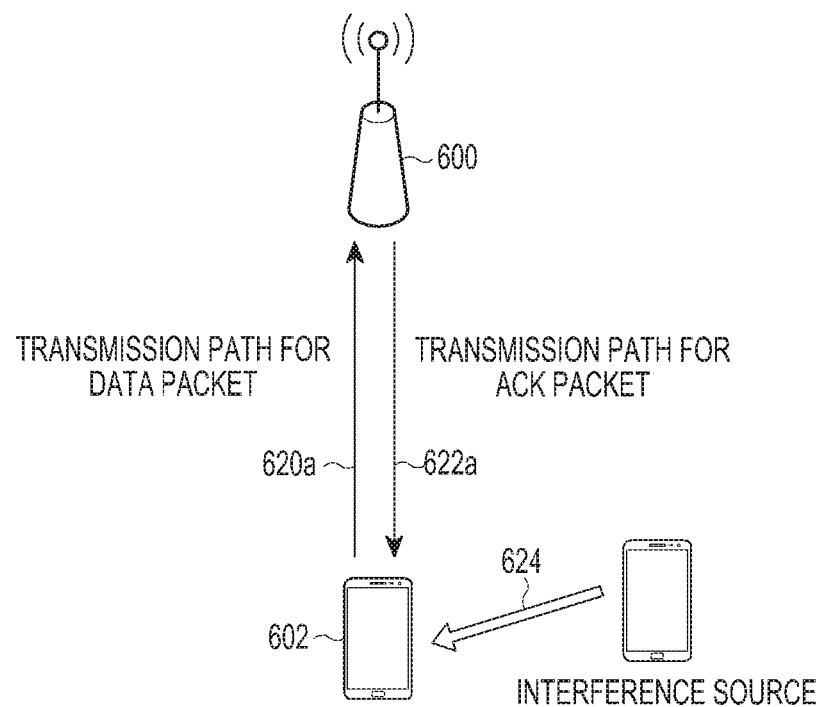
FIG. 6B is a view illustrating an example where a transmission beam of an acknowledgement (ACK) packet is changed in the third situation according to an embodiment of the present disclosure.
Figure 6C:
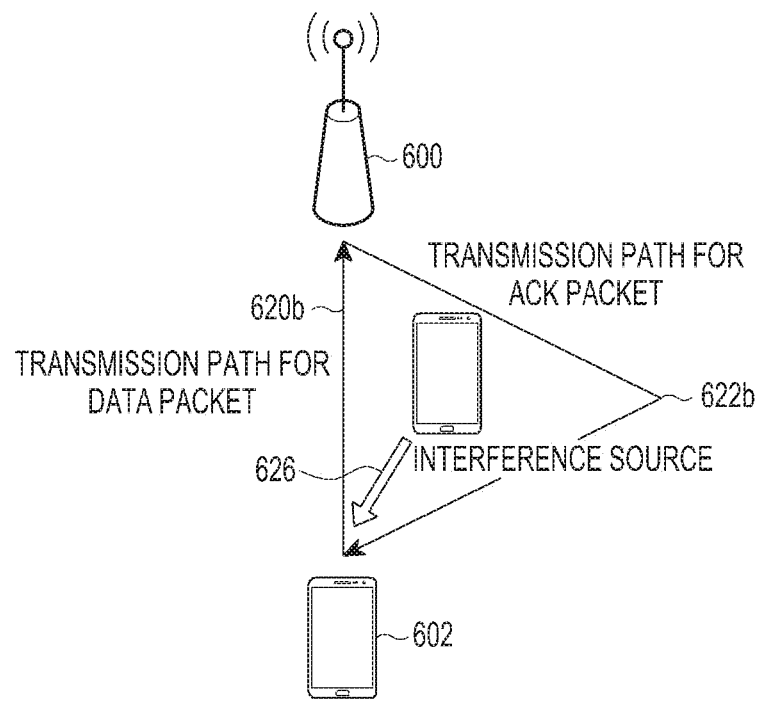
FIG. 6C is a view illustrating an example according to an embodiment of the present disclosure.

FIGS. 6B and 6C are views illustrating an example where a transmission beam of an ACK packet is changed in the third situation according to an embodiment of the present disclosure.

Referring to FIG. 6B, the UE 602 transmits a data packet through a transmission beam of 620a, and the eNB 600 transmits an ACK packet to the UE 602 through a transmission beam 622a configured for the transmission of the ACK packet of the data packet. In this case, as in reference numeral 624, although an interference source resulting from communication of another UE occurs, the communication direction of the interference source does not affect the data packet and the ACK signal between the UE 602 and the eNB 600. Accordingly, the UE 602 and the eNB 600 may transmit/receive the data packet and the ACK packet regardless of the communication 624 of the interference source.

Meanwhile, referring to FIG. 6C, it is assumed that communication 626 of the interference source occurs in a direction 620b in which the UE 602 receives an ACK signal from the eNB 600. In this case, interference does not occur in a path in which the eNB 600 receives a data packet from the UE 602, but the UE 602 has difficulty in receiving the ACK signal due to the communication 626 of the interference source. Thus, since it is difficult to receive the ACK signal, the third situation may occur. Accordingly, the UE 602 may change an ACK signal transmission beam of the eNB 600 and an ACK signal reception beam of the UE 602 according to the method described in FIG. 6A, and may make a configuration such that a transmission path of the ACK packet 622b is not affected by the communication 626 of the interference source, as illustrated in FIG. 6C.

Meanwhile, when an interference situation occurs as described above, the third scheme according to yet another embodiment may be changed in a form in which, after data packets are completely transmitted, an ACK packet of each of the data packets is received.

Figure 7:
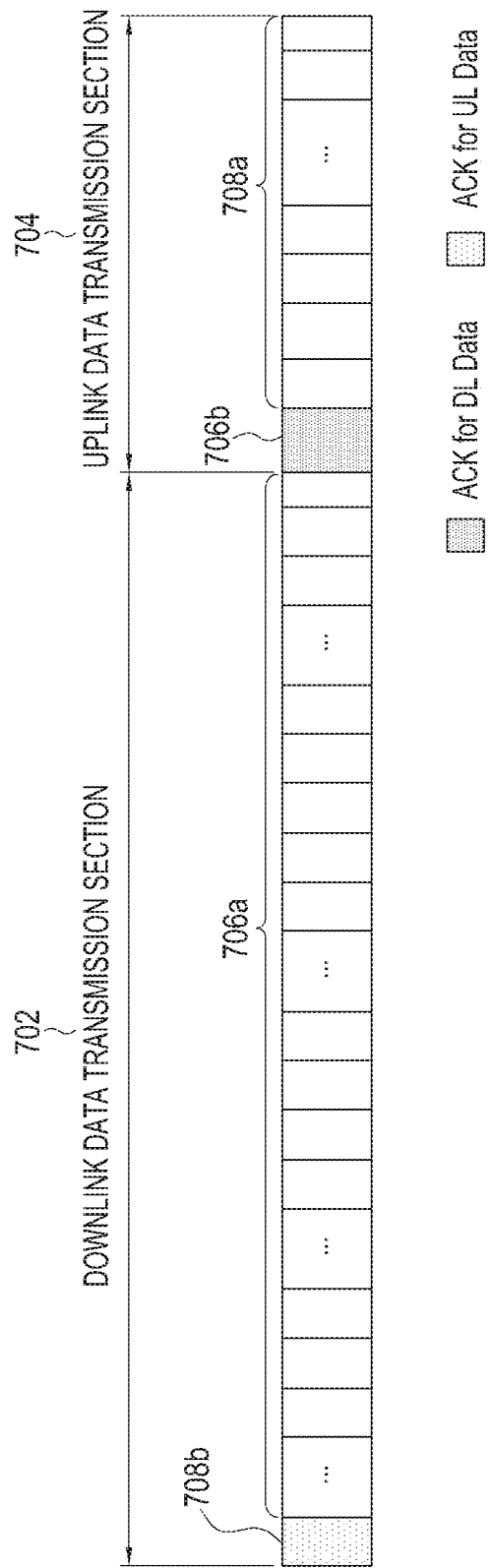
FIG. 7 is an example illustrating another embodiment of a third scheme according to an embodiment of the present disclosure.

FIG. 7 is an example illustrating another embodiment of the third scheme according to an embodiment of the present disclosure.

Referring to FIG. 7, in another embodiment of the present disclosure, a structure in which, immediately after the uplink data transmission section 206 within the uplink data transmission section, the downlink ACK packet corresponding thereto is received (as indicated by reference numeral 208), as illustrated in FIG. 2, may be changed as follows.

Referring to FIG. 7, only uplink data 708a is transmitted within an uplink data transmission section 704, and an ACK packet of an eNB, which corresponds to the uplink data, may be received through a partial section 708b of a downlink data transmission section 702 as an example of a separate section. Likewise, in the corresponding embodiment, only downlink data 706a is transmitted within a downlink data transmission section 702, and an ACK packet of an eNB, which corresponds to the downlink data, may be received through a partial section 706b of an uplink data transmission section 704 as an example of a separate section.

Meanwhile, when signals of the UE and the eNB are transmitted, if the same preamble sequence is used between adjacent cells, signals of the UE and the eNB existing in a serving cell may be missed because it is busy to decode a signal transmitted by an interference node existing in the adjacent cells. Thus, the UE and the eNB according to the present disclosure transmit signals using a preamble based on a cell-specific sequence such that successful decoding is possible even in a multi-cell interference situation.

In order to indicate whether the ACK packet according to an embodiment of the present disclosure is received for each payload included in one or more A-MPDUs, the bitmap size M of a block ACK (BA) packet is configured to correspond to bits, the number of which is two to three times of payloads included in the corresponding A-MPDU.

Further, when a data packet for a transmission terminal is transmitted in the form of an A-MPDU according to an embodiment of the present disclosure, the following information may be additionally included in a header signal or a payload signal of the corresponding A-MPDU. Here, the information additionally included in the header or the payload may include information on an MCS level and a transmission beam index of the ACK packet which a transmission terminal is to transmit after the IFS time after the A-MPDU is completely transmitted, information whether a reception terminal directly transmits the ACK packet or utilizes a Delayed ACK packet in a separate resource section after the IFS time after the A-MPDU is completely transmitted, and the like.

Figure 8:
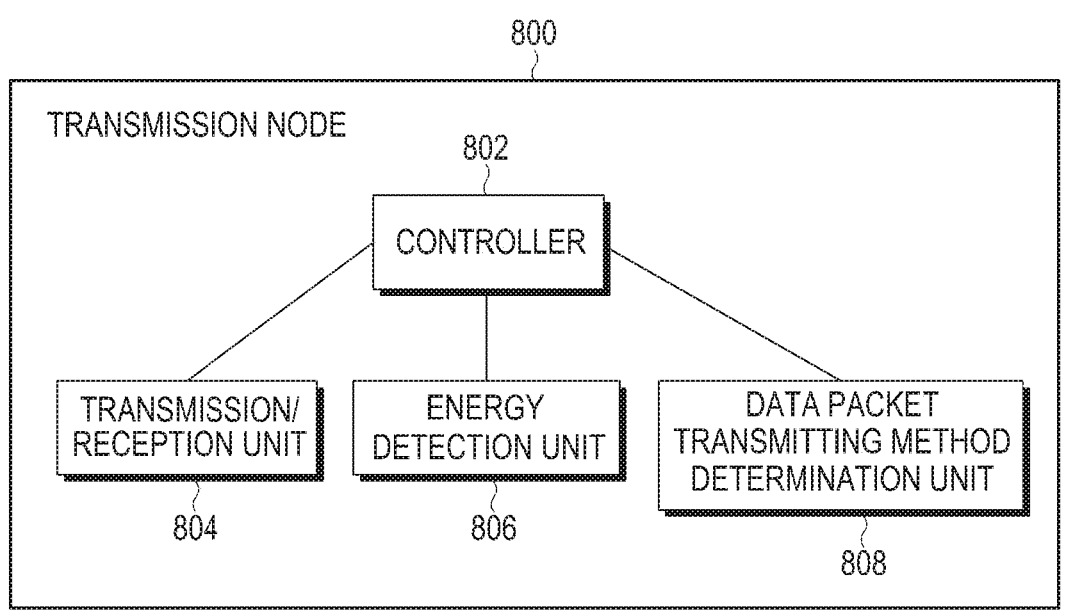
FIG. 8 is an example of a configuration of the UE according to an embodiment of the present disclosure.

FIG. 8 is an example of a configuration of the UE according to an embodiment of the present disclosure.

Referring to FIG. 8, a UE 800 includes, for example, a controller 802, a transmission/reception unit 804, an energy detection unit 806, and a data packet transmitting method determination unit 808. The configuration of the UE 800 is illustrated as an example for the convenience of description, and according to the intention of an operator or various embodiments, the corresponding configuration may be segmented into a plurality of sub-units, or a plurality of units may be integrated into one unit.

After transmitting a data packet through the transmission/reception unit 804, the controller 802 waits for receiving an ACK packet for the data packet during a predetermined time section. When the ACK packet is not received during the time section, the controller 802 detects an energy level of a reception signal in a time section corresponding to a preamble signal of the ACK packet as in operation 306 of FIG. 3, and identifies a reason for reception failure for the ACK packet using the detected energy levels. Further, the controller 802 determines a transmitting method for the data packet or the ACK packet according to each embodiment of FIGS. 4, 5, and 6A using the detected energy level or an SINR value calculated on the basis of the same, and then transmits/receives the corresponding packet through the transmission/reception unit 804. Since the detailed description therefor is duplicated with FIGS. 4, 5, and 6A, the detailed description therefor will be omitted.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for transmitting data by a user equipment (UE) in a wireless communication system, the method comprising:
    transmitting, to a base station, a channel information request;
    transmitting, to the base station, a data packet based on a first channel information value received in response to the transmitted channel information request, and awaiting reception of a response packet indicating reception of the data packet from the base station;
    identifying that the reception of the response packet fails during a predetermined time interval;
    detecting an energy level associated with a strength of a signal received in the predetermined time interval;
    identifying a situation among multiple situations indicating failures of the reception of the response packet respectively based on the detected energy level; and
    identifying whether to reconfigure one of a transmitting method for the response packet from the base station or a transmitting method for a next data packet to the base station based on the identified situation,
    wherein the multiple situations include the energy level being maintained at a minimum threshold value, the energy level corresponding to a maximum threshold value, or the energy level received being larger than the maximum threshold value.

2. The method of claim 1, wherein the identifying of whether to reconfigure the one of the transmitting method for the response packet from the base station or the transmitting method for the next data packet to the base station based on the detected energy level comprises:
    based on the detected energy level corresponding to the minimum threshold value, identifying that the base station does not transmit the response packet;
    retransmitting, to the base station, the channel information request; and
    reconfiguring the transmitting method for the next data packet based on a second channel information value received in response to the retransmitted channel information request.

3. The method of claim 2, wherein the reconfiguring of the transmitting method for the next data packet comprises:
    based on the second channel information value being worse than the first channel information value, reconfiguring the transmitting method; and
    transmitting the next data packet based on the reconfigured transmitting method.

4. The method of claim 2, wherein the reconfiguring of the transmitting method for the next data packet comprises:
    based on the second channel information value being not included in a channel information table stored in the UE, stopping the transmitting of the next data packet.

5. The method of claim 2, wherein the reconfiguring of the transmitting method for the next data packet comprises:
    based on the second channel information value corresponding to the first channel information value, maintaining a transmitting method of the data packet.

6. The method of claim 1, wherein the identifying of whether to reconfigure the one of the transmitting method for the response packet from the base station or the transmitting method for the next data packet to the base station based on the detected energy level comprises:
    based on the detected energy value corresponding to the maximum threshold value, and an energy level in an end time of the predetermined time interval is less than the minimum threshold value, identifying that the data packet is successfully received by the base station; and
    transmitting, to the base station, the next data packet and information related to transmission of the response packet.

7. The method of claim 1, wherein the identifying of whether to reconfigure the one of the transmitting method for the response packet from the base station or the transmitting method for the next data packet to the base station based on the detected energy level comprises:
    based on the detected energy value corresponding to the maximum threshold value, and an energy level in an end time of the predetermined time interval is greater than the minimum threshold value, identifying that the response packet is not received due to interference signals;
    reconfiguring the transmitting method for the response packet; and
    transmitting the next data packet and information related to transmission of the response packet based on the reconfigured transmitting method for the response packet.

8. The method of claim 7, wherein identifying whether to reconfigure the one of the transmitting method for the response packet from the base station or the transmitting method for the next data packet to the base station based on the detected energy level comprises:
    measuring an interference amount for each reception candidate beam of the response packet;
    identifying a new reception beam based on the measured interference amounts; and
    based on a first transmission beam of a reception node corresponding to the identified new reception beam being different from a second transmission beam used when the base station transmits the response packet, configuring the first transmission beam as a new transmission beam.

9. The method of claim 8, wherein identifying whether to reconfigure the one of the transmitting method for the response packet from the base station or the transmitting method for the next data packet to the base station based on the detected energy level comprises:
    identifying, as the new reception beam, a candidate beam having a minimum value of the measured interference amounts or having a maximum value of signal to interference plus noise ratios (SINRs) calculated using the measured interference amount, among the candidate beams.

10. The method of claim 1, wherein information on the reconfigured transmitting method for the response packet includes at least one of a modulation and coding scheme (MCS) level to be applied to the response packet, a transmission beam index, or time information indicating whether a time is delayed.

11. A user equipment (UE) for transmitting data by a in a wireless communication system, the UE comprising:
    a transmitter;
    a receiver; and
    at least one processor configured to:
        control the transmitter to transmit, to a base station, a channel information request, control the transmitter to transmit, to the base station, a data packet based on a first channel information value received in response to the transmitted channel information request,
control the receiver to await reception of a response packet indicating reception of the data packet from the base station,
identify that the reception of the response packet fails during a predetermined time interval,
detect an energy level associated with a strength of a signal received in the predetermined time interval
identify a situation among multiple situations indicating failures of the reception of the response packet respectively based on the detected energy level, and
identify whether to reconfigure one of a transmitting method for the response packet from the base station or a transmitting method for a next data packet to the base station based on the identified situation,
wherein the multiple situations include the energy level being maintained at a minimum threshold value, the energy level corresponding to a maximum threshold value, or the energy level received being larger than the maximum threshold value.

12. The UE of claim 11,
wherein, if the detected energy level corresponds to the minimum threshold value, the at least one processor is further configured to identify that the base station does not transmit the response packet;
wherein the at least one processor is further configured to control the transmitter to retransmit, to the base station, the channel information request; and
wherein the at least one processor is further configured to reconfigure the transmitting method for the next data packet based on a second channel information value received in response to the retransmitted channel information request.

13. The UE of claim 12, wherein, if the second channel information value is worse than the first channel information value, the at least one processor is further configured to transmit the next data packet based on the reconfigured transmitting method.

14. The UE of claim 12, wherein, if the second channel information value is not included in a channel information table stored in the UE, the at least one processor is further configured to stop the transmitting of the next data packet.

15. The UE of claim 12, wherein, if the second channel information value corresponds to the first channel information value, the at least one processor is further configured to maintain a transmitting method of the data packet.

16. The UE of claim 11,
wherein, if the detected energy value corresponds to the maximum threshold value, and an energy level in an end time of the predetermined time interval is less than the minimum threshold value, the at least one processor is further configured to determine that the data packet is successfully received by the base station, and
wherein the at least one processor is further configured to control the transmitter to transmit, to the base station, the next data packet and information related to transmission of the response packet.

17. The UE of claim 11,
wherein, if the detected energy value corresponds to the maximum threshold value, and an energy level in an end time of the predetermined time interval is greater than the minimum threshold value, the at least one processor is further configured to:
identify that the response packet is not received by the base station due to interference signals,
reconfigure the transmitting method for the response packet, and
control the transmitter to transmit the next data packet and information related to transmission of the response packet based on the reconfigured transmitting method for the response packet.

18. The UE of claim 17,
wherein the at least one processor is configured to:
measure an interference amount for each of reception candidate beams of the response packet, and
identify a new reception beam based on the measured interference amounts,
wherein, when a first transmission beam of a reception node corresponding to the determined new reception beam is different from a second transmission beam used when the base station transmits the response packet, the at least one processor is further configured to configure the first transmission beam as a new transmission beam, and
wherein the at least one processor is further configured to identify, as the new reception beam, a candidate beam having a minimum value of the measured interference amounts or having a maximum value of signal to interference plus noise ratios (SINRs) calculated using the measured interference amount, among the candidate beams.

19. The UE of claim 11, wherein information on the reconfigured transmitting method for the response packet includes at least one of a modulation and coding scheme (MCS) level to be applied to the response packet, a transmission beam index, or time information indicating whether a time is delayed.

20. A non-transitory computer processor readable storage medium including instructions, executable by a computer processor, stored thereon to perform the method of claim 1.

* * * * *